(12) United States Patent
Evans et al.

(10) Patent No.: US 7,770,134 B2
(45) Date of Patent: *Aug. 3, 2010

(54) METHODS AND APPARATUSES FOR HANDLING SINGLE-USER APPLICATIONS IN MULTI-USER COMPUTING ENVIRONMENTS

(75) Inventors: Christopher A. Evans, Sammamish, WA (US); Giampiero M. Sierra, Seattle, WA (US); Sterling M. Reasor, Bellevue, WA (US); Frank D. Yerrace, Woodinville, WA (US); Victor Tan, Kirkland, WA (US); Louis Amadio, Issaquah, WA (US); Kelly E. Rollin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

This patent is subject to a terminal disclaimer.

(21) Appl. No.: 11/739,641

(22) Filed: Apr. 24, 2007

(65) Prior Publication Data

US 2007/0260990 A1 Nov. 8, 2007

Related U.S. Application Data

(60) Division of application No. 09/999,894, filed on Oct. 31, 2001, now Pat. No. 7,213,054, which is a continuation-in-part of application No. 09/573,628, filed on May 17, 2000, now Pat. No. 6,807,666.

(60) Provisional application No. 60/170,956, filed on Dec. 15, 1999.

(51) Int. Cl.
*G06F 3/048* (2006.01)
(52) U.S. Cl. .................. 715/827; 715/718; 715/741; 715/750
(58) Field of Classification Search ................. 715/827, 715/718, 741, 750
See application file for complete search history.

(56) References Cited

U.S. PATENT DOCUMENTS 7,213,054 B2   5/2007  Evans et al.

OTHER PUBLICATIONS

KDE, The Complete Idiot's Guide to Linux, Copyright (C) 1998 by Que Corporation; pp. 1-2.*

* cited by examiner

*Primary Examiner*—Steven P Sax
*Assistant Examiner*—Andrey Belousov

(57) ABSTRACT

Methods and apparatuses are provided for controlling application software while switching between session in a multi-session computing environment. An apparatus includes memory coupled to switching logic and application program managing logic. The switching logic is configured to selectively switch console control of a computing device between at least two user kernel sessions that are maintained in the memory. The application program managing logic is configured to selectively control at least one application program that is operatively configured within at least one of the user kernel sessions. For example, the application program managing logic can be configured to stop the operation, restart certain application programs, notify application programs about switching events, and/or adjust the playback of audio and/or video signals associated certain application programs.

1 Claim, 13 Drawing Sheets

METHODS AND APPARATUSES FOR HANDLING SINGLE-USER APPLICATIONS IN MULTI-USER COMPUTING ENVIRONMENTS

RELATED APPLICATIONS

This application is a divisional of and claims priority to U.S. patent application Ser. No. 09/999,894 entitled "Methods and Apparatuses For Handling Single-User Applications In Multi-User Computing Environments" filed Oct. 31, 2001, to Evans et al., the disclosure of which is incorporated by reference herein.

U.S. patent application Ser. No. 09/999,894 is a continuation-in-part (CIP) of U.S. patent application Ser. No. 09/573,628, which was filed May 17, 2000, now U.S. Pat. No. 6,807,666, and titled "Methods And Arrangements For Providing Multiple Concurrent Desktops And Workspaces In A Shared Computing Environment". U.S. patent application Ser. No. 09/573,628, now U.S. Pat. No. 6,807,666, further claims priority from U.S. Provisional application Ser. No. 60/170,956, filed Dec. 15, 1999, entitled "Multiple Desktops To Provide Separate Concurrent Work Spaces For Multiple Users Using The Same Computer", the disclosure of which is incorporated by reference herein.

TECHNICAL FIELD

This invention relates to computers and software, and more particularly to methods and apparatuses for use in switching user kernel sessions and handling application level software in such a multi-user computing environment.

BACKGROUND

There are many situations where several people would like to share a single computer. For example, a home may have a single personal computer (PC) that is shared by the family members. If these users desire a unique configuration, privacy, and/or security for their applications and data files, such a shared computing environment may not adequately accommodate them.

For example, with most operating systems, the users share a single workspace. Unfortunately, doing so does not allow personalization of their workspace or security of data between users. In certain operating systems, users may separate their data into multiple "profiles" or "accounts". One of the drawbacks to this scheme is that if one user is using the computer and a another user would like to access their own files, the first user would have to close all open applications in order for the other user to log on to the system and access their data. Thus, the first user's application state is lost. In addition to losing the application state, the user is inconvenienced because of the time involved with closing down the prior user's state and re-establishing the new user's state.

Certain solutions, such as, for example, the "Identity Manager" available in Microsoft Outlook Express version 5.0, allow certain user data to be shared among separate users without losing all of the application's states during a user switch. However, the Identity Manager manages only a small subset of the user's data. Text documents, for example, are not stored separately for each user. Furthermore, there is little workspace personalization available and the user data is not secured for other user access.

Consequently, there is a need for an improved methods and apparatuses for use in multiple user computing environments. Preferably, the methods and arrangements will allow for a plurality of desktops, workspaces and/or user kernel sessions within a shared computing environment.

Furthermore, there is a need to provide methods and apparatuses for handling application software, and in particular single-user application software, when a plurality of desktops, workspaces and/or user kernel sessions are provided within a shared computing environment.

SUMMARY

The present invention provides methods and apparatuses for handling application software, and in particular single-user application software, when a plurality of desktops, workspaces and/or user kernel sessions are provided within a shared computing environment.

The above stated needs and other are met, for example, by an apparatus that includes memory coupled to switching logic and application program managing logic. The switching logic is configured to selectively switch console control of a computing device between at least two user kernel sessions that are maintained in the memory. The application program managing logic is configured to selectively control at least one application program that is operatively configured within at least one of the user kernel sessions. By way of example, the application program managing logic can be configured to stop the operation of one or more application programs. In certain instances, when the application program managing logic stops the operation of an application program, it also records or otherwise stores information associated with the application program such that the stopped application may be re-started at a later time. In still other implementations, the application program managing logic is configured to notify one or more application programs when a session switching or like event occurs or is about to occur. Thus, the application program may respond accordingly to the notification/event. A session switching event, for example, may be associated with a logon process, creating a new user kernel session, disconnecting an existing user kernel session, re-connecting an existing user kernel session, or the like.

In accordance with certain additional implementations, the apparatus may also include an audio mixer capability that is operatively coupled to the application program managing logic and at least one application program. Here, the application program managing logic can be configured to cause the audio mixer to selectively adjust an audio signal associated with the application program. In certain instances, the audio signal may include information identifying a user kernel session corresponding to the application program.

In still other implementations, the apparatus includes having the switching logic dynamically or otherwise maintain identifying data associated with each user kernel session. The application program managing logic is then configured to access the identifying data as needed to make controlling decisions. Similarly, in certain implementations, the application controlling logic also dynamically maintains identifying data associated with running and/or re-startable application programs. The application program managing logic may also be configured to access identifying data associated application programs that have been predetermined to be selectively controlled by the application program managing logic. In certain further implementations, the application program managing logic may be configured to prompt the user for input (e.g., approval, etc.) with regard to the handling of an application program.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
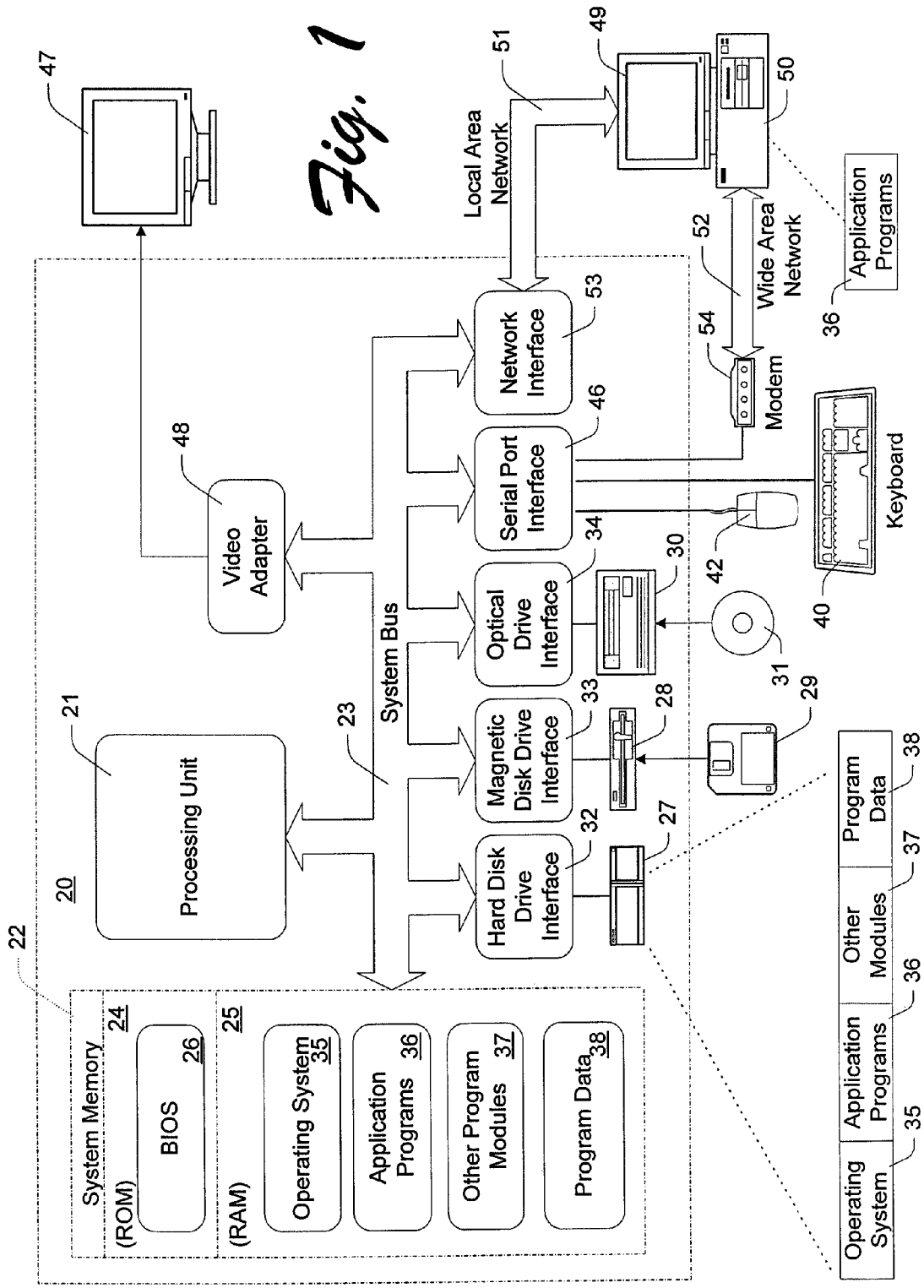
FIG. 1 is a block diagram depicting an exemplary computer system.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
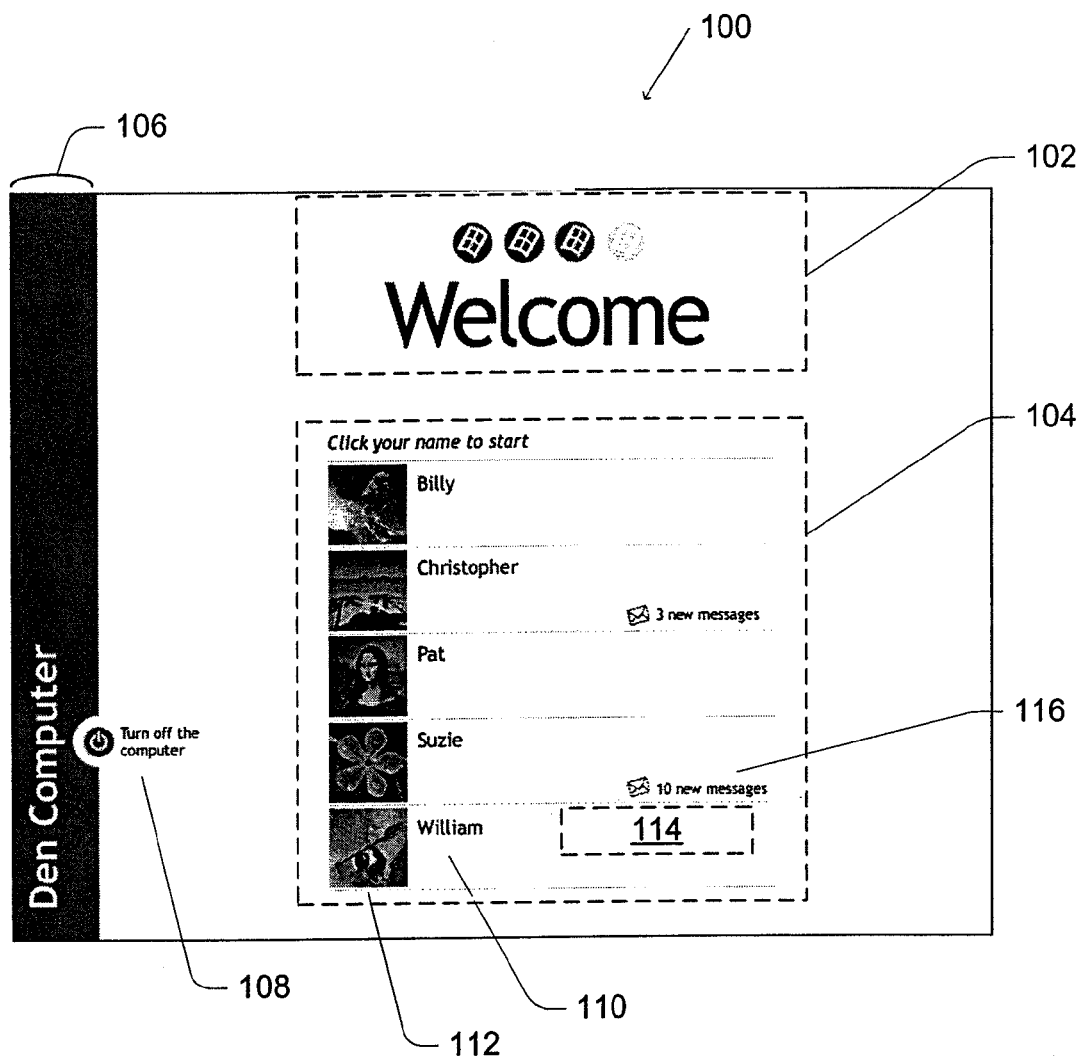
FIG. 2 depicts an exemplary logon screen display suitable for use in the computer system of FIG. 1.

Reference is now made to FIG. 2, which depicts an exemplary graphical user interface (GUI) display suitable for use in identifying users to the operating system of computer 20.

Here, a logon screen 100 is shown as having a first title area 102 that identifies logon screen 100. Logon screen 100 may take up be a full screen of display 47 or a portion thereof As shown, first title area 102 can include any graphical feature (e.g., bitmap, photo, video, text, etc).

Logon screen 100 also includes a multiple user logon area 104 wherein the user is presented with selectable user identifiers and related information and permitted to input certain data. In this example, logon area 104 is configured for five different users, namely, Billy, Christopher, Pat, Suzie, and William; each being identified by a text identifier 110 and/or graphical identifier 112. Thus, William may begin logging on to the operating system by selecting either text identifier 110 and/or graphical identifier 112. If William has an established password, then a password input field 114 is displayed and configured to receive his password. Once William's password has been authenticated then William is logged on. If William does not have an established password, then he would be logged on after selecting text identifier 110 or graphical identifier 112. Logon screen 100 can also be configured to display other user related information 116 to a user. In this example, user related information 116 identifies that Suzie has ten (10) new messages.

A second title area 106 is shown in this example along the left hand border of logon screen 100. Here, second title area 106 identifies the computer as the "Den Computer". A selectable shut down mechanism 108 is also provided to allow a user to shut down the computer.

Logon screen 100 is, by way of example, the starting point for this description of the various methods and arrangements that allow for a plurality of separate and concurrent desktops and workspaces within the shared computing environment of computer 20. As described in more detail below and depicted in the flowcharts of FIGS. 3-4, a desktop switching scheme is implemented for use with Microsoft Windows™ NT or Windows™ 2000. Those skilled in the art, however, will recognize that the desktop switching scheme is applicable to other operating systems, computers, etc. For example, the scheme is extended herein to further include WinStation switching, each of which may include desktop switching as well.

The exemplary implementations presented herein utilize the Desktop application programming interfaces (APIs) available in Windows NT to create separate workspaces for each user who interactively logs on through logon screen 100. Using Windows NT profiles, the user's data is separated from other user's data and depending on the user's or the computer manager's preferences, access to other user's data can be secured. By using a separate desktop for each user, multiple users can be logged on to the computer simultaneously. Switching users is very fast, since it is just a desktop switch. No application state is lost during the switch because the applications run within the context of a desktop and are completely separated from one another.

To protect the user's logon session from other users if the users should happen to walk away form the computer without securing their workstation, the operating system will automatically switch back to the logon desktop after a user configurable timeout period. The logon desktop is secured from the user desktops and can only switch back to a user desktop if the user is identified by an authentication entity within the operating system.

Figure 3:
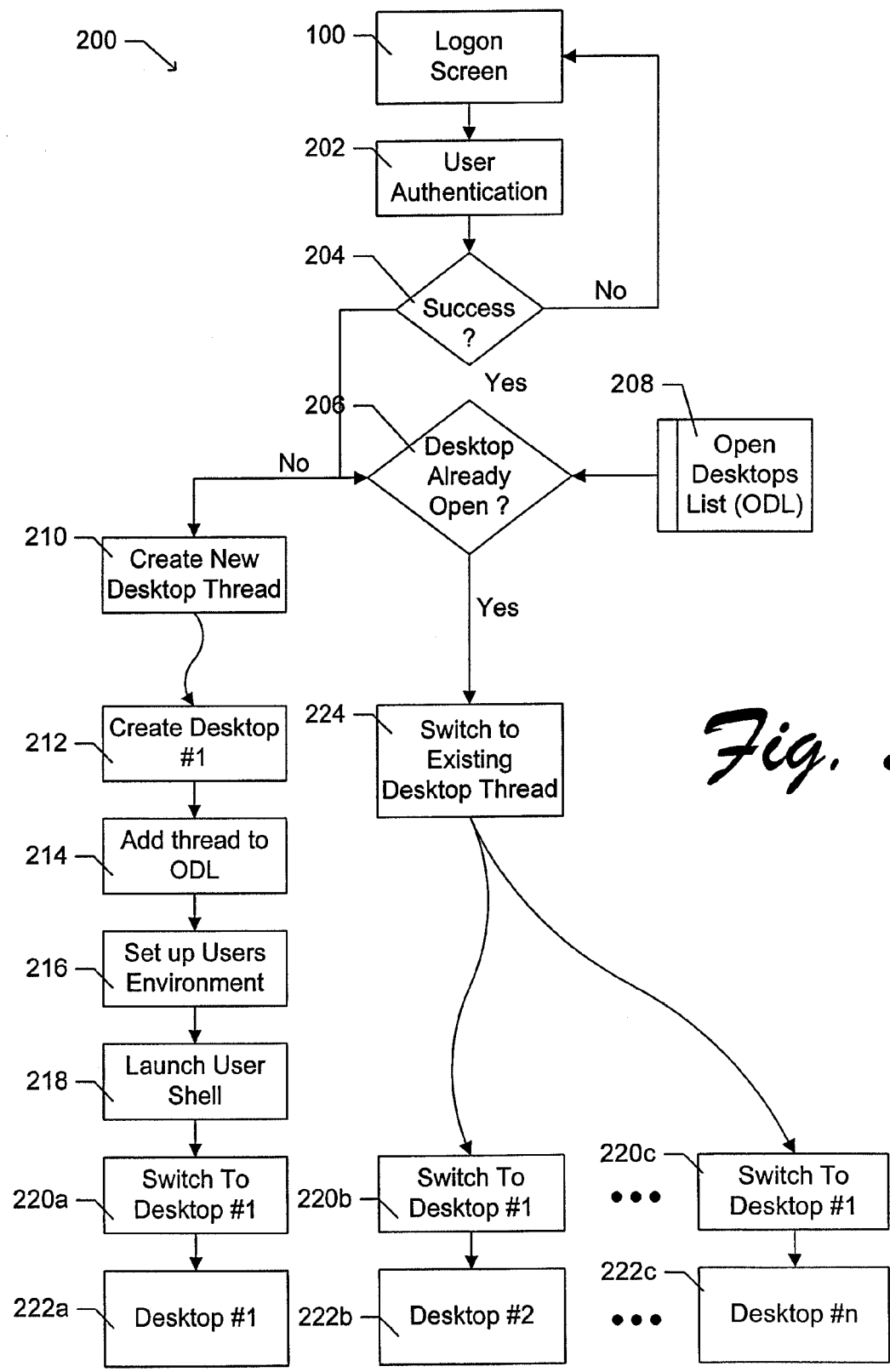
FIG. 3 is a flowchart depicting an exemplary process for identifying users, and creating and maintaining a plurality of separate and concurrent desktops or remote processes.

With this in mind, attention is drawn to the flowchart in FIG. 3. Here, process 200 begins with the computer displaying logon screen 100. In step 202, the user provides the necessary inputs to logon as part of the user authentication scheme. For example, the user selects text identifier 110 or graphical identifier 112 and subsequently enters a password in password input field 114. The authentication process occurs in the operating system, as depicted by decision step 204. If the authentication was not a success, then in accord with step 204 (NO), process 200 returns to logon screen 100. If the authentication was a success, then in accord with step 204 (YES), process 200 continues to decision step 206.

In decision step 206, it is determined if the authenticated user from step 204 is already logged in. This is accomplished by checking open desktops list (ODL) 208. If the authenticated user has not already logged in per step 206 (NO), then in accordance with step 210 a new desktop thread is created for this user. In step 214, the thread and desktop information are then added to the list of users currently logged on within ODL 208. The user's thread also sets up the user environment in step 216, and starts the user shell on their newly created desktop in step 218. In step 220 the logon program switches to the user's new desktop 222. At this point, the logon process is complete.

Returning to decision step 206, if a desktop is already open for the user as demonstrated by an associated entry in ODL 208, then step 206 (YES) advances process 200 to step 224. In step 224, a switch is made to the existing desktop thread, followed by a switch to the applicable desktop 222, in step 220. In FIG. 3 there are N>1 desktops as represented by desktops 222a-c.

Figure 4:
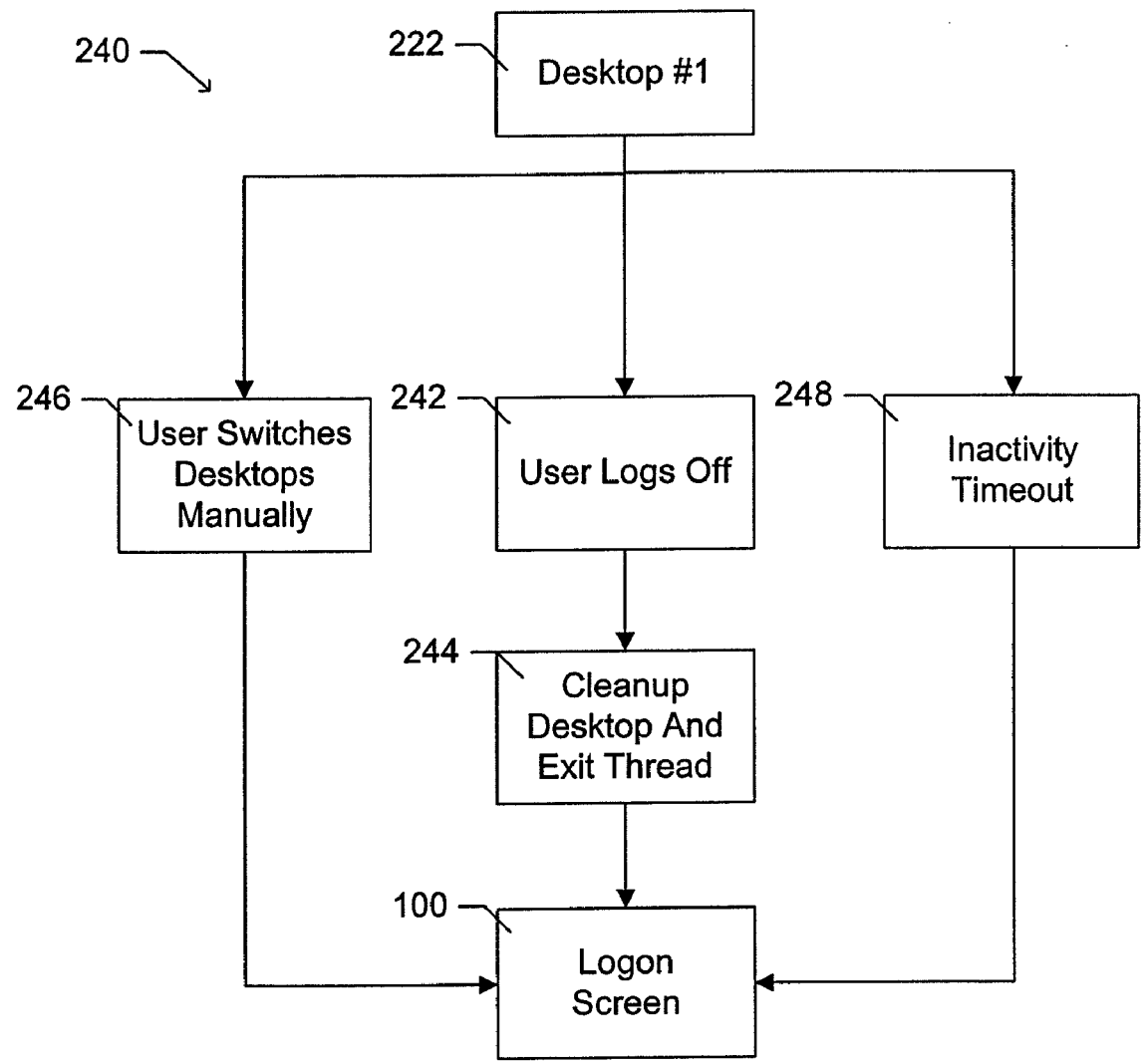
FIG. 4 is a flowchart depicting an exemplary process for switching between desktops or remote processes.

Reference is now made to FIG. 4, wherein a flowchart depicts a process 240 for logging off of a desktop 222. In this example, there are three ways for the user to become "logged off". The first takes place in step 242, wherein the user intentionally and fully logs off. When such a logoff event is generated in step 242, then in step 244 the desktop is cleaned up, ODL 208 is updated and the thread is terminated. After step 244, process 240 returns to logon screen 100.

The second way for a user to become "logged off" is provided in step 246, wherein the user switches desktops manually. At any point prior to logging off, the user can initiate an action (e.g., by user input), which will return them to logon screen 100 without signaling the user's thread that a logoff has occurred. When this happens, the user's desktop remains running and all applications that have been started on that desktop continue to run. However, the user is unable to see any of these applications because their desktop is essentially hidden. At this point, the desktop is said to be "switched out", but it is still active. The user will need to log on again in accord with process 200 to have the active desktop "switched in".

The third way that a user can become "logged off" is shown in step 248, wherein after a user configurable period of inactivity (e.g., no mouse activity or keyboard input) the operating system will assume that the user has stopped working on the computer for the time being and it will automatically switch back to logon screen 100. This helps to improve security by securing the user's desktop when they no longer appear to be using the computer. It also makes it easier for other users to utilize the computer and not worry about ending another user's session.

It is also possible to provide a plurality of separate and concurrent environments within the shared computing environment by switching remote processes, such as, for example, WinStations, instead of desktops. Logically, WinStations contain multiple desktops. Creating a WinStation for each user and switching the active WinStation when a user logs on or switches back to logon screen 100 could implement the same mechanism as described above.

Figure 5:
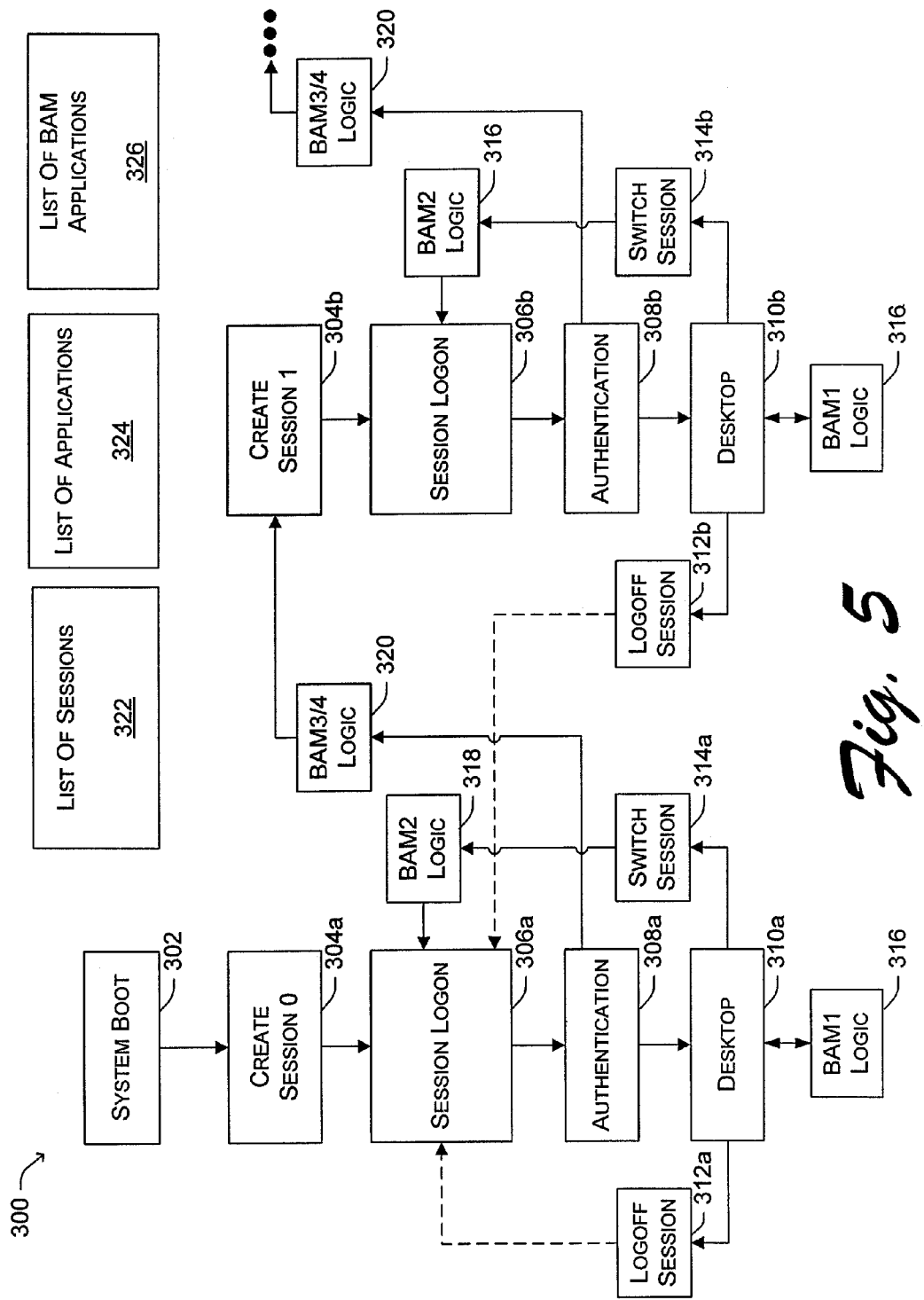
FIG. 5 is a block diagram depicting an exemplary user kernel session switching arrangement having bad application manager (BAM) logic configured to handle certain applications.

Attention is now drawn to FIG. 5, which is a block diagram depicting an exemplary arrangement 300 for use in a computer that is configurable to support a plurality of user kernel sessions (e.g., WinStations) wherein the sessions are switched back and forth at various times depending upon the user. Here, for example, individual sessions are either currently operatively associated with the console (e.g., controls, display, etc.) of the computer (i.e., currently connected), or not currently operatively associated with the console of the computer (i.e., currently disconnected).

Arrangement 300 includes bad application manager (BAM) logic that is configured to stop, start, notify, and/or otherwise control certain applications or features thereof at various session times/events associated with switching between sessions or disconnecting a current session.

In exemplary arrangement 300, by way of example, certain applications will be defined as falling into one of four categories referred to as BAM1, BAM2, BAM3, and BAM4. Logic associated with each of these categories of applications is represented by BAM1 logic 316, BAM2 logic 318, and BAM3/4 logic 320.

With this in mind, the description will now focus on the start of a first session (session 0) and then the start of a second session (session 1), and then the switching of sessions.

To begin with, the computer and its operating system, etc., are booted-up per block 302. Next, in block 304a, session 0 is created by starting a user kernel session. In this example and those that follow, it is assumed that various users will be required to logon. This occurs in the session login 306a, which is configured to display an interactive GUI or the like that prompts the user to login, for example, as described in the above multiple desktop arrangements. Next, there is an authentication 308a to verify that the user inputs from session login 306a. Following authentication, a desktop 301a is provided to the user. At this point the user is fully logged in and his/her user kernel session is currently connected such that the applicable computer resources are available for use.

Let us now assume, for example, that this user decides to open (start) an application from the desktop. By way of example, the user may start a FOO application that is a single-user application. Since there are no other sessions, there should not be any problems with running the FOO application at this time. At other times there may be a problem running the FOO application, for example, if the FOO application was already running in another session, and for whatever reason it is not possible to have two instances of the FOO application running simultaneously. This can occur, for example, when the first instance of the FOO application locks up a resource, such as, e.g., a file on the root of the hard drive, which is required by the second instance of the FOO application. Other examples of problems caused by such applications include locking files in a shared folder, and/or tying up hardware resources, such as, e.g., serial ports, etc. When these and/or other problems occur, the second instance of the FOO application will most likely fail to load or operate properly. As referred to herein, these and other types of applications are termed "bad applications".

Consequently, in accordance with certain aspects of the present invention, bad application manager (BAM) functionality is added in the form of BAM logic that can be, for example, provided with the operating system. In certain exemplary implementations of the present invention, applications are to be tested or otherwise evaluated within a multi-session environment to determine their behavior or misbehavior. Those applications that do not exhibit any problems can be deemed to be "good applications". The remaining applications, which will therefore be deemed to be "bad applications", may then be categorized based, for example, on the problems that occur during evaluation and/or an approach that seems to support the desired multi-user/session environment.

By way of example, in certain exemplary implementations of the present invention, the so-called bad applications are placed into to at least one of four categories: BAM1, BAM2, BAM3, and BAM4 applications. These BAM applications may be identified in a listing or other like data structure that is associated with the BAM logic. For example, a list of BAM applications 326 is depicted in FIG. 5.

BAM1 applications are those applications that are basically non-intrusive, but may not behave well when two or more copies are run in the same computing environment. Referring to FIG. 5, in the example above, when the user selects the FOO application through desktop 310a the FOO application is allowed to run, since there are no other instances of the FOO application running at this time in other sessions. Conversely, if there were another instance of the FOO application running then BAM1 logic 316 would determine if the FOO Application is a BAM1 application per list of BAM applications 326, and how to handle the user request to launch the FOO application in the current session.

Figure 6:
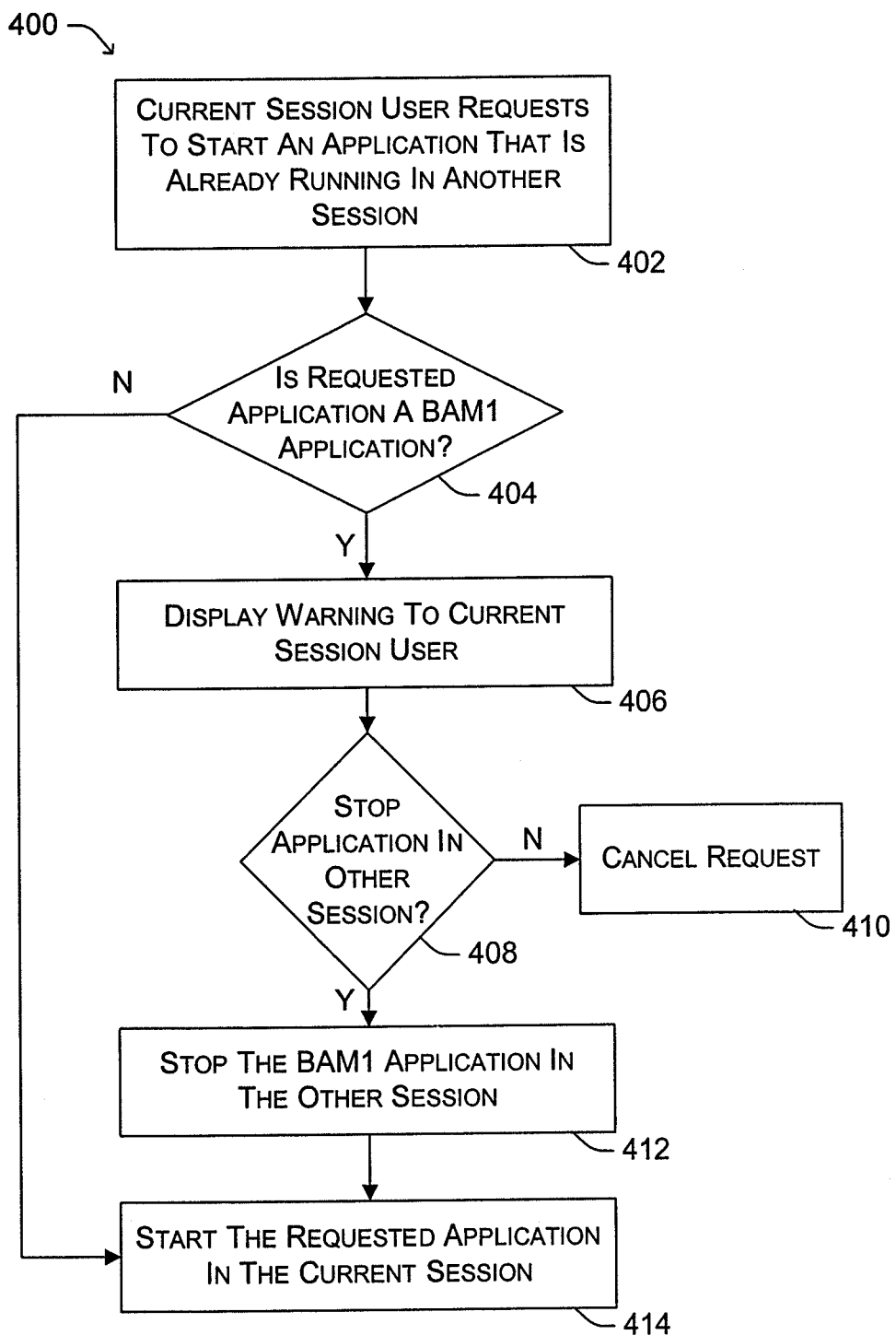
FIG. 6 is an exemplary flow diagram for a process that can be implemented in bad application manager (BAM) logic configured to handle BAM1 category applications.

An example of a decision process 400 that may be implemented in BAM1 logic 316 is shown in FIG. 6. Here, in step 402, the current user has requested to start an application that is already running in at least one other session. To determine if, and/or keep track of the applications that are running across a plurality of sessions, a list of "running" applications 324 is maintained. Also, as shown, a list of sessions 322 is also maintained to keep track of the sessions that open (i.e., the current connected session and all disconnected sessions).

Next, in step 404, a decision is made as to whether the requested application is a BAM1 application, for example, per list of BAM applications 326. If the requested application is not a BAM1 application, then process 400 continues with step 414, wherein the requested application is started in the current session. If the requested application is a BAM1 application, then process 400 continues with step 406, wherein, for example, a prompt/message is displayed in the GUI notifying the user that another user is already running the requested application.

In step 408, the user is given a choice of stopping (quitting) the application that is running in the other session. Here, the user may be warned that stopping the application may cause the other user to loose important data. If the user decides to leave the application in the other session running, then process 400 moves to step 410, wherein the request to start the application is canceled. If the user decides in step 408 to stop the application that is running in the other session, then process 400 moves to step 412, wherein the BAM1 application running in the other session is stopped. Next, in step 414 the requested (BAM1) application is then started in the current session.

Returning now to FIG. 5, from desktop 310a the user can later elect to end the current session via logoff session 312a. This will stop all applications, etc., associated with the user. As shown by the dashed line, session 0, which in this example so far is the only session open, returns to session login 306a following logoff session 312a.

Rather than logging off, the user or perhaps another user may elect to switch to another session, per switch session 314a. This session switch may be user initiated or the result of a timeout period having expired. In either case, switch session 314a leads to BAM2 logic 318.

BAM2 logic 318 is configured to handle BAM2 applications. BAM2 applications are those applications that do not properly handle the switching of desktops and/or sessions.

For example, certain applications may interfere with the display of the logon GUI associated with session logon 306a. One example is a DVD player application that generates a video stream that interferes with the GUI display. Since BAM2 applications are so incompatible with the multi-session environment, BAM2 logic 318 essentially preempts any of the problems by automatically stopping the BAM2 application before the session logon 306a process begins again.

Figure 7:
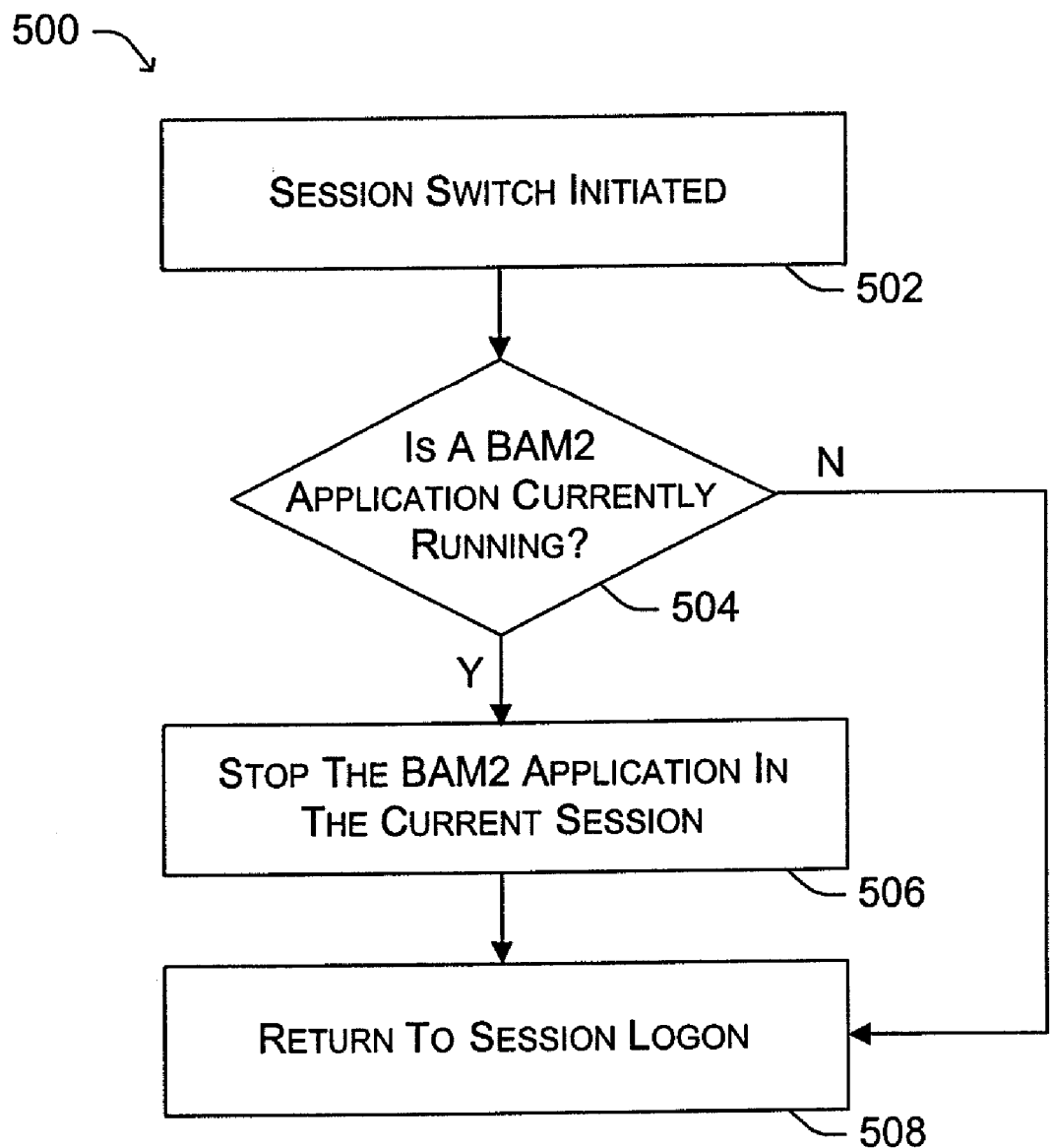
FIG. 7 is an exemplary flow diagram for a process that can be implemented in bad application manager (BAM) logic configured to handle BAM2 category applications.

An example of a decision process 500 that may be implemented in BAM 2 logic 318 is shown in FIG. 7. Here, in step 502, a session switch is initiated, for example as described above. Next, in step 504, it is determined if a BAM2 application is running in the current session. This determination can be made, for example, based on the list of BAM applications 326. If there are no BAM2 applications running in the current session, then process 500 moves to step 508, wherein session logon 306a takes over. If, there is a BAM2 application running in the current session, then in step 506, the BAM2 application(s) is stopped. Then, process 500 moves to step 508.

With reference once again to FIG. 5, at this point in the example, session 0 is still running, only it is at this point session 0 is disconnected. Session logon 306a would therefore present a login GUI through which the user that started session 0 could log back on to continue session 0 (i.e., make session 0 connected once again).

Let us assume instead, that another user decides to logon through session logon 306a. After verifying the new user's logon information, authentication 308a leads to BAM 3 and BAM 4 (BAM3/4) logic 320, in this example, prior to creating a new session for this new user. BAM3/4 logic 320 is configured to handle applications that are running in other sessions that may in some way interfere with the new session about to be created or re-connected, and/or interfere with the new user in some manner.

BAM3 applications are those applications that may not release shared resources. For example, service-like applications that run in the background yet tie up resources for a particular user/session may be considered BAM3 applications. One example of a BAM3 application is an application that supports the connectivity of a personal digital assistant (PDA) through a serial communication port. Such PDA applications usually synchronize files, etc., between the PDA and the computer. Unfortunately, such applications may lockup the serial port and therefore inhibit other users/sessions from using the communication port.

Figure 8:
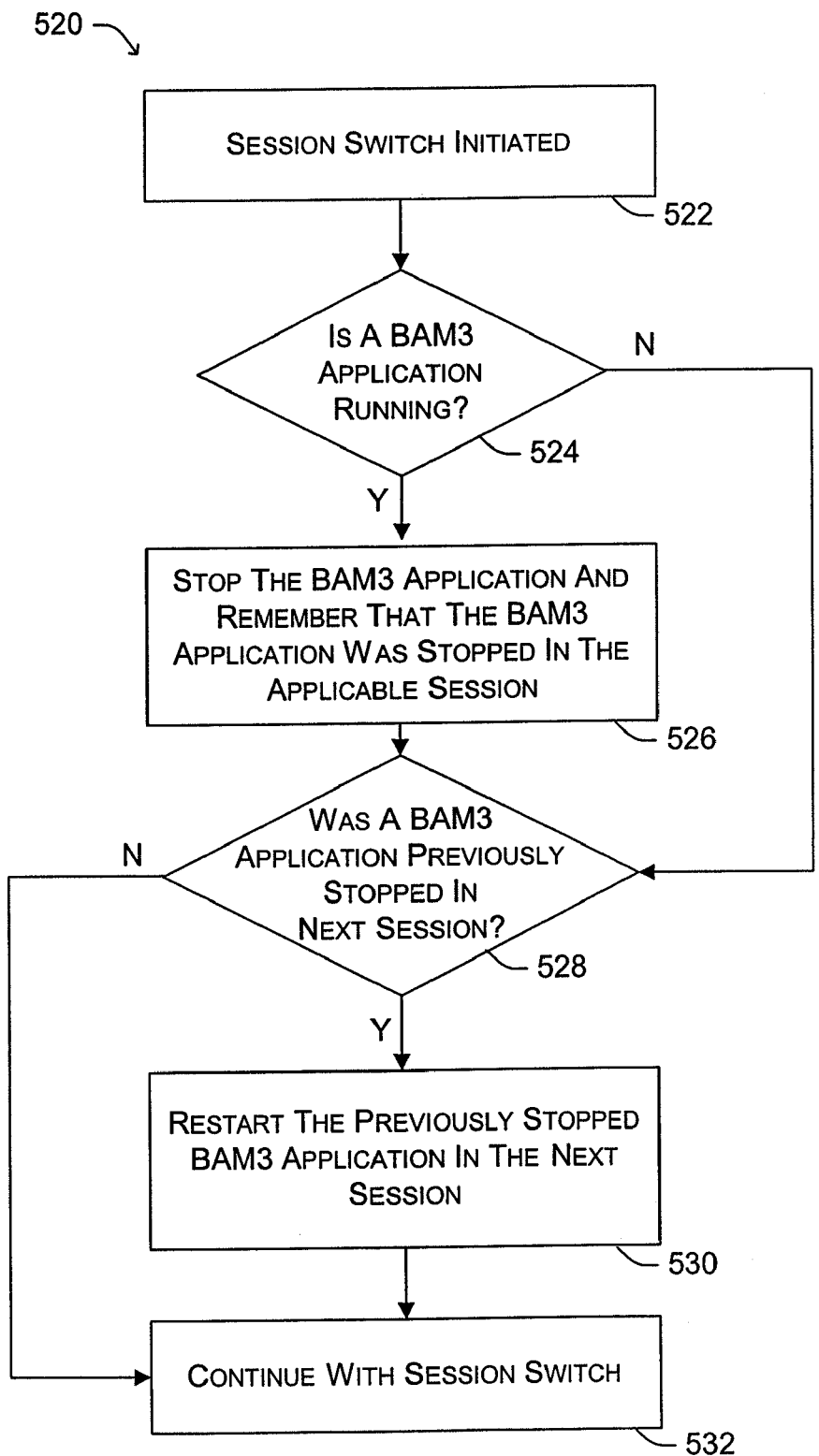
FIG. 8 is an exemplary flow diagram for a process that can be implemented in bad application manager (BAM) logic configured to handle BAM3 category applications.

An example of a decision process 520 that may be implemented in BAM3/4 logic 320, to handle BAM3 applications, is shown in FIG. 8. Here, in step 522, a session switch is initiated. Next, in step 524, a determination is made as to whether any BAM3 applications are running in other sessions, for example, in session 0. This determination can be made, for example, based on the list of BAM applications 326. If there is a BAM3 application running, then in step 526 the BAM3 application(s) is stopped and information is maintained, for example, in the list of applications 324, as to the BAM3 application that was stopped and the session that it was running in. This recorded information can later be used to restart the BAM3 application upon re-connecting the previous session. Process 520 then moves to step 528. Also, as shown, if a determination is made in step 524 that there is no BAM3 application running, then process 520 moves ahead to step 528.

In step 528, a decision is made as to whether there was a BAM3 application, associated with the session that is about to be re-connected, that was previously stopped per step 526. If there was a BAM3 application that was previously stopped, then in step 530 the BAM3 application is restarted in the session to be joined. After that, in step 532, the session switch would continue.

Obviously, in the example described above, wherein the user and session are new, the decision in step 528 will be NO. As such, process 520 would move ahead to step 532 and the session switch would continue.

BAM4 applications are those applications that are resource intensive, play a lot of audio or perhaps in some other way may hinder the user of the session being created or re-connected. One example of a BAM4 application is a media player application that continues to play audio even when the user/session that launched the player is not connected. Hence, if this BAM4 application is not stopped, then the new user in the example above would have to listen to the audio playing from a previous (now disconnected) session.

Figure 9:
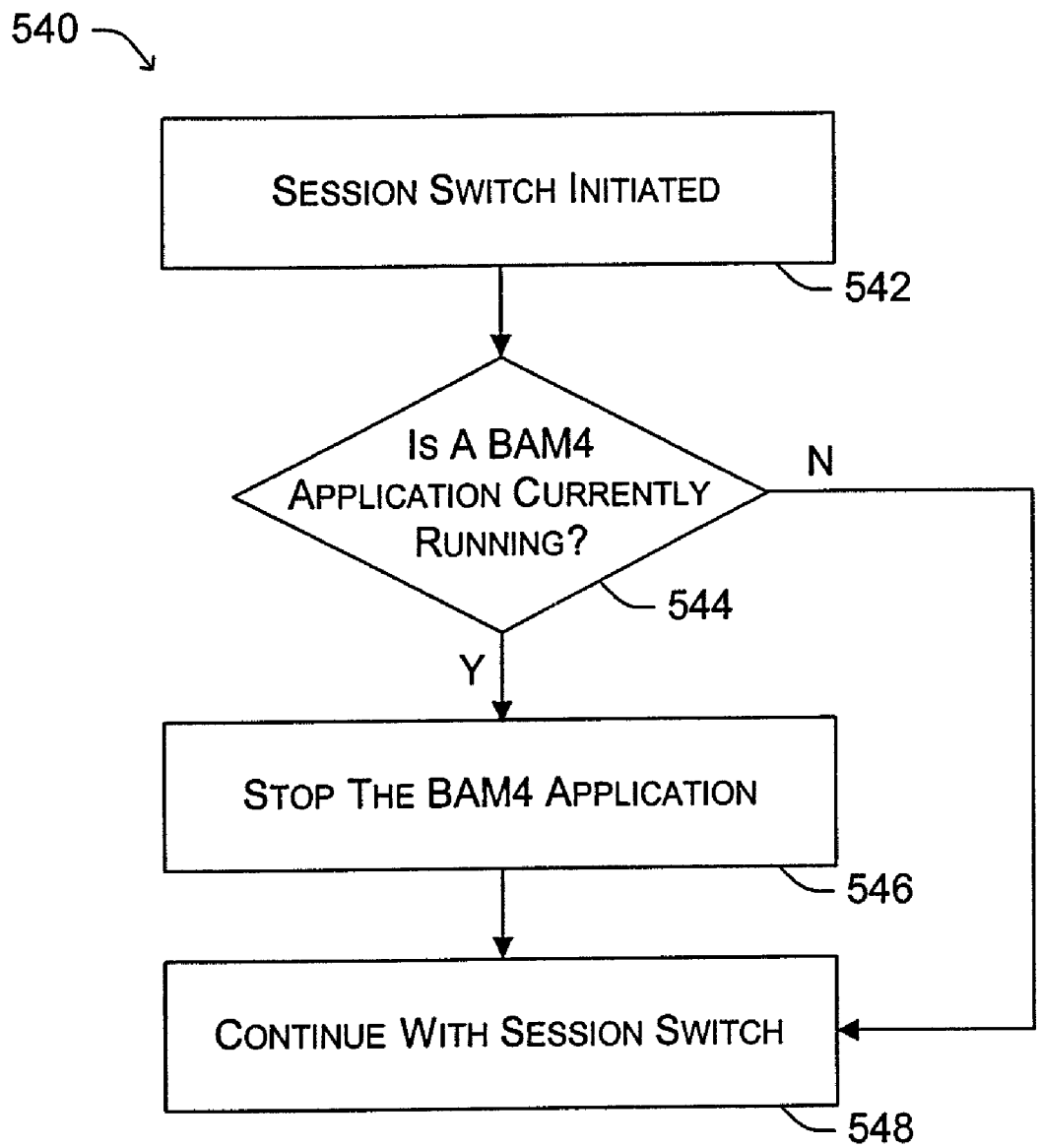
FIG. 9 is an exemplary flow diagram for a process that can be implemented in bad application manager (BAM) logic configured to handle BAM4 category applications.

An example of a decision process 540 that may be implemented in BAM3/4 logic 320, to handle BAM4 applications, is shown in FIG. 9. Here, in step 542, a session switch is initiated, causing a decision to be made in step 544 as to whether a BAM4 application is running in a session. This decision may be made, for example, based on the list of BAM applications 326. If no BAM4 applications are running then in step 548 the session switch continues. If there is a BAM4 application running, then in step 456, the BAM4 application is stopped. After that, the session switch continues per step 548.

Returning again to FIG. 5 and the exemplary new user/session scenario from above, following BAM3/4 logic 320, session 1 is started in create session 304b. Although session logon 306b and authentication 308b are depicted as following create session 304b, it should be understood that these functions may be skipped in whole or part if authentication 308a shares information (e.g., the new user's credentials) with authentication 308b. As such, it is assumed that the new session in the above example causes a new desktop 310b to be created.

At this point, the new user is able to start up applications, etc. As shown, however, BAM1 logic 316 (as described earlier) is used to control the potential deleterious effects of any BAM1 applications that the user may request to start up. Should the user decide to disconnect the session per switch session 314b, then, as with session 0, BAM2 logic 316 will handle BAM2 applications, and BAM314 logic 320 will handle any BAM3 or BAM4 applications when another session (e.g., session 2) is created or session 0 is reconnected. If the user of session 1 decides to end the session 1, i.e., per logoff session 312b, then in this example, as shown in the dashed line session login 306a will take over after session 1 has ended.

As represented by the dots following BAM3/4 logic 320 after session 1, additional sessions can be created, disconnected, re-connected, or ended in a similar manner.

Figure 10A:
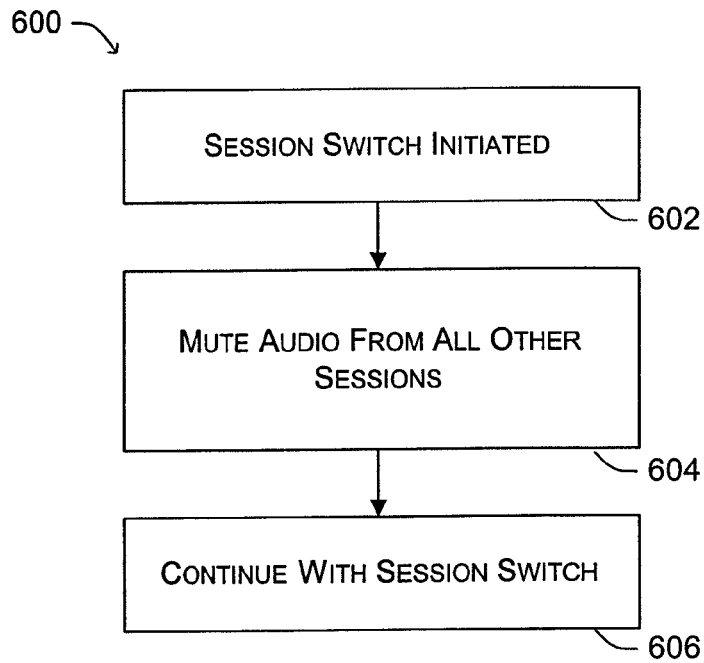
FIG. 10A is an exemplary flow diagram for a process that can be implemented in bad application manager (BAM) logic configured to adjust the volume of audio content associated with different user kernel sessions.

FIG. 10A is a flow diagram depicting another process 600 that may be implemented in the BAM logic or other like logic. Process 600 is configured to handle the playing or output of audio signals or streams from various applications running in a plurality of sessions. In step 602, a session switch is initiated. In step 604, the audio from applications, etc., which is running in sessions other than the session being created or re-connected, is muted or otherwise reduced/eliminated. In step 606, the session switch is continued. In this manner, unwanted audio signals associated with other sessions are not played.

Figure 10B:
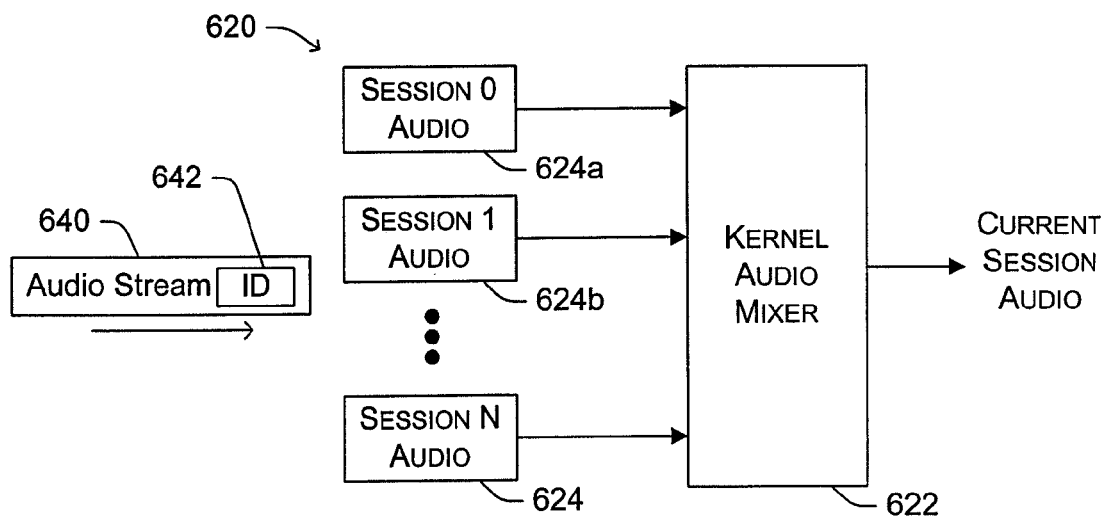
FIG. 10B is a block diagram illustrating a kernel audio mixer capability and associated audio data streams associated, for example, with the process in FIG. 10A.

FIG. 10B depicts one way to accomplish the muting in process 600. Here, an illustrative arrangement 620 shows a kernel audio mixer 622 that is configured to mix audio signals or streams from various applications, programs, modules, the operating system, and the like. Kernel audio mixer 622 produces a current session audio playback signal/data, which is reproduced by one or more speakers. Conventional kernel audio mixers exist; many are a mix of hardware and software logic.

As illustrated, session audio 624 from various sessions is provided to kernel audio mixer 622, which can selectively adjust the volume of the various inputs and mute them as well. In illustrative arrangement 620, an exemplary audio stream 640 is graphically depicted as having a session identifier (ID) 642 that allows kernel audio mixer 622 to determine which session audio stream 640 is associated with. In this manner, the proper audio signals will be played and the other session's audio signals will be essentially muted.

Figure 11:
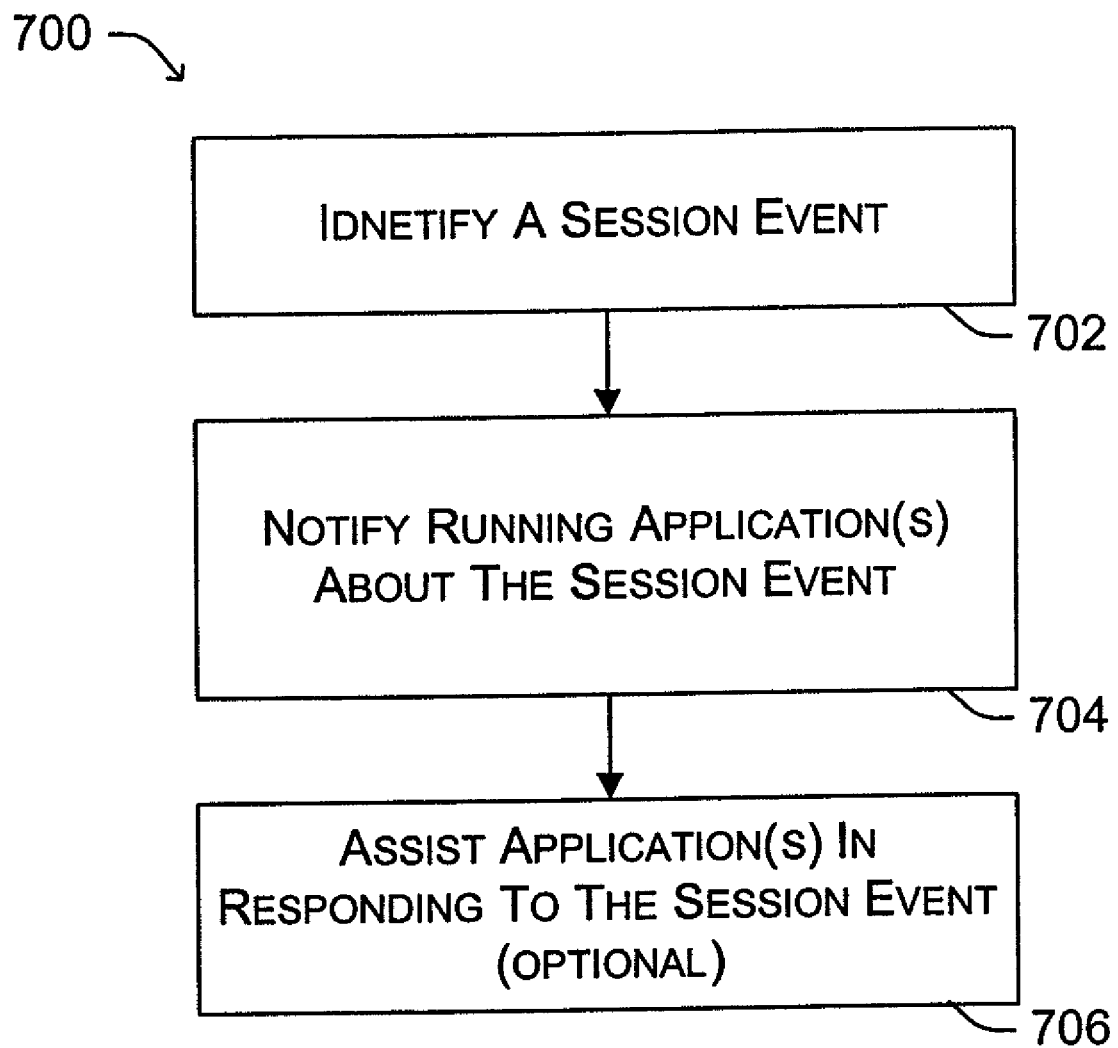
FIG. 11 is an exemplary flow diagram for a process that can be implemented in a bad application manager (BAM) logic, wherein the BAM logic is configured to notify the application software about certain user kernel session events.

In accordance with still other implementations of the present invention, the BAM logic above or other like logic can be configured to notify or in some other way identify certain session events, for example, session switching related events, to applications ("good" or "bad" applications) that are running and which may be affected by the session event. FIG. 11 depicts a process 700 that illustrates this notification capability. Here, in step 702, a session event occurs or is about to occur. By way of example, a session event may indicate a return to session logon 306a, the creation or re-connection of a session, or the disconnection of a session (local or remote). Whatever the session event, in step 704, the applicable logic notifies one or more applications that are running in connected or disconnected sessions, as deemed appropriate for a given system. In step 706, if needed, the logic assists the applications in responding to the session event.

Thus, in certain implementations, the notification capability in process 700 may strengthen or otherwise augment the session switching oversight responsibility of the BAM logic. Here, for example, the notified applications may save data that might otherwise be lost due to the operation of the BAM logic, unlock certain resources, voluntarily stop/mute their audio streams, voluntarily stop running in part or whole, or re-start functions that were previously stopped.

In accordance with certain other aspects of the present invention, the task of switching between users/sessions may further be enhanced by adding a capability for the user to quickly initiate a switch, for example, by simply inputting a hot key combination or the like. Thus, for example, a user that is logged on may cause a switch to another user/session by holding down a hot key combination that automatically brings up a graphical user interface or the like that shows what other sessions/users may be selected and then switched to. This type of capability can be provided, for example, in logic associate with switch session 314(a, b . . . ) depicted in FIG. 5. The necessary BAM logic can be applied accordingly, during this "hot key" type of switching process.

Although referred to as a hot key, those skilled in the art will now recognize that a dedicated "switch user" input key may also be provided on the keyboard or in other locations on the computer console, etc., and configured to initiate a similar user/session switching process.

Figure 12:
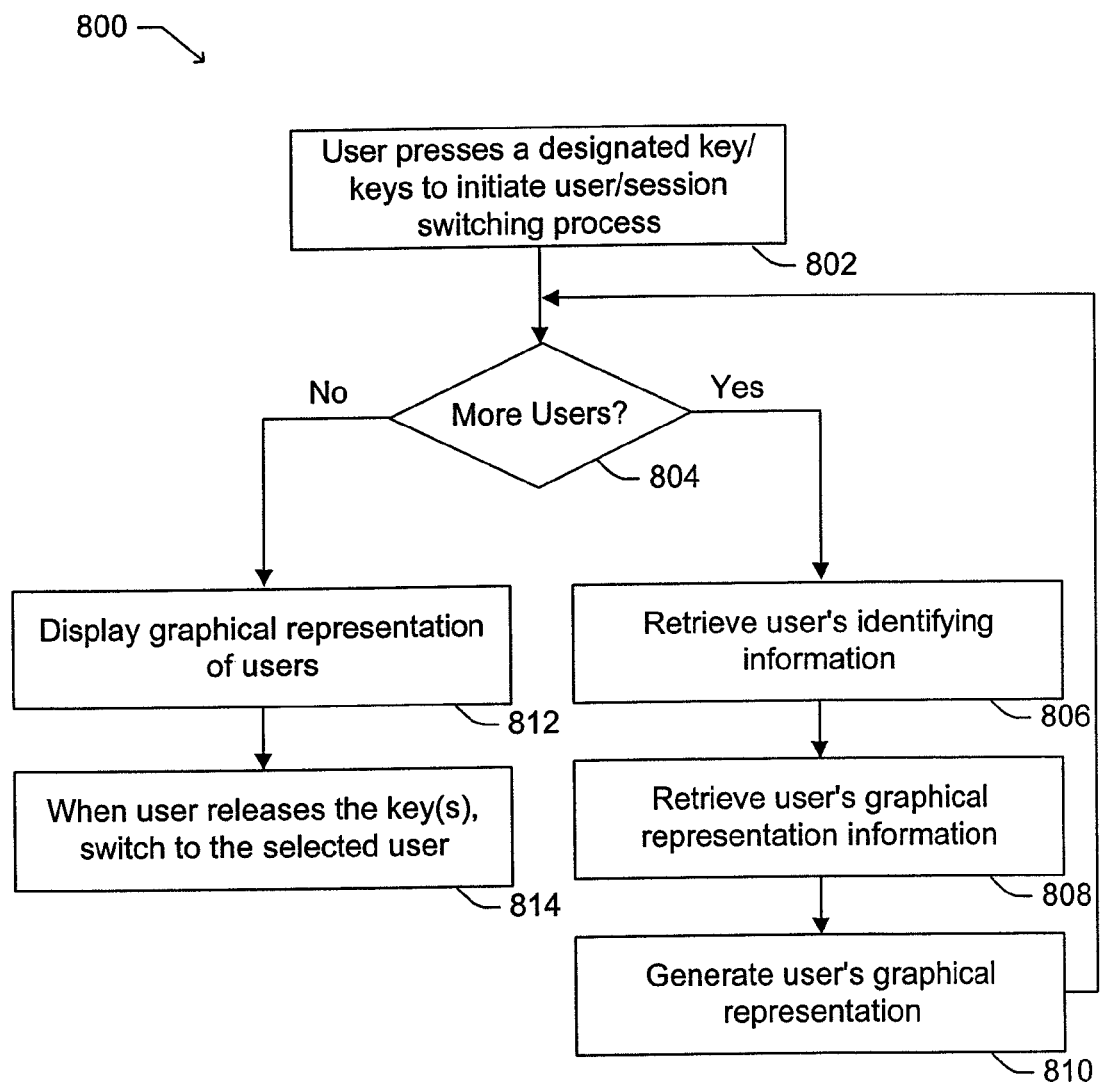
FIG. 12 is a flow diagram associated with an additional exemplary user/session switching capability, in accordance with certain further implementations of the present invention.

With these examples in mind, reference is now made to FIG. 12, which is a flow diagram of a process 800 associated with an exemplary hot key based user/session switching capability, in accordance with certain implementations of the present invention.

In step 802 the user presses or otherwise activates one or more hot keys to initiate a user/session switching process. For an actual hot key combination in a computer running a Microsoft Windows® operating system, for example, the user would continue to hold the hot key combination down during step 802 and later release the depressed hot key combination in step 814. One exemplary hot key combination includes two standard keys on a keyboard, namely, the Windows® Graphical Icon key and the letter Q key. Other combinations and/or single keys may also be assigned this functionality.

In response to the continued user hot key input started step 802, in step 804, a decision is made as to whether the system is configured to support any other users. Assuming that there are other users supported by the computer; then in step 806, user identifying information is retrieved from the operating system, for example. In certain configurations, the user identifying information includes the name assigned to the user. In step 808, should there be any specific graphical representation information associated with the user, then such information is also retrieved. In certain implementations, for example, image and/or graphical information is retrieved in step 808. In step 810, an applicable graphical representation is generated based on the information retrieved in steps 806 and 808. By way of example, the graphical representation that is generated may include the user's name and associated image.

Returning to decision step 804, steps 806, 808 and 810 are then repeated for each of the potential users. Next, in step 812, each of the graphical user representations is displayed for the user through a graphical user interface (GUI). In accordance with certain exemplary implementations, the GM is configured to automatically rotate the selection of graphical representations in such a manner that when the user sees that the desired user's graphical representation is displayed as being selectable, then the user can indeed select that the switch be made to that user by releasing or otherwise deactivating the hot key combination in step 814. Thus, for example, the GUI in step 812 may visually rotate through the graphical representations while pausing briefly on each one so as to allow the user adequate time to select the graphical representation and switch to the associated user/session. An example of one such GUI is illustrated in the screen shot depicted in FIG. 13.

Figure 13:
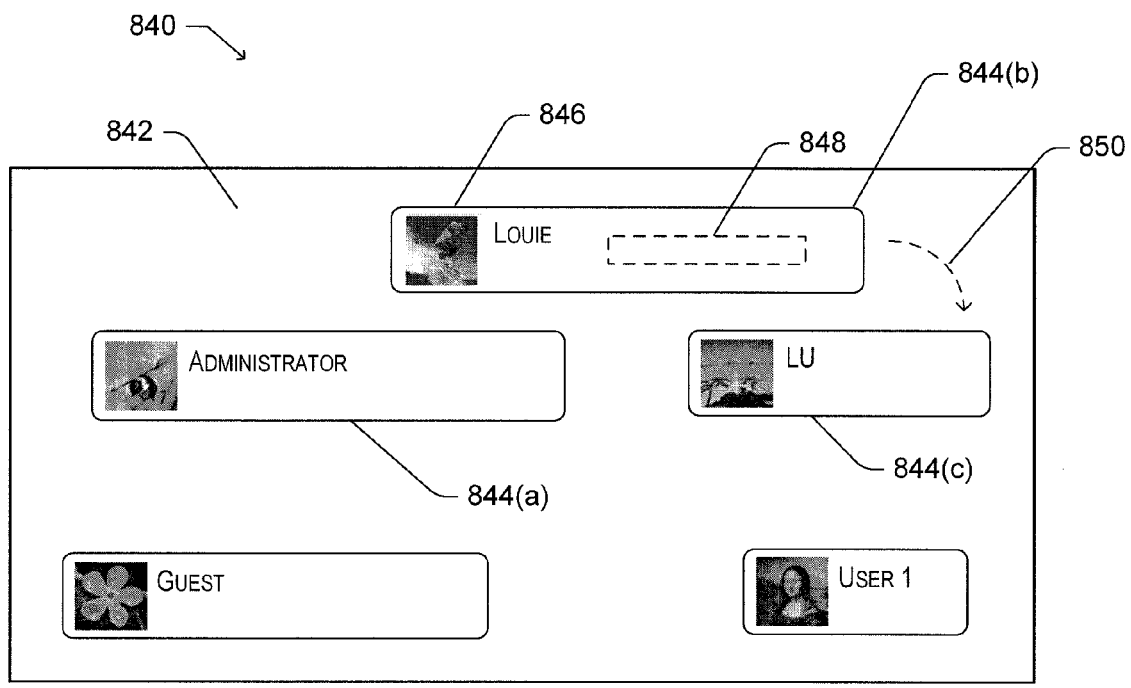
FIG. 13 is an exemplary graphical user interface (GUI) having selectable graphical user representations associated with the additional exemplary user/session switching capability of FIG. 12, in accordance with certain implementations of the present invention.

As shown in FIG. 13, a GUI display 840 includes a background image 842 having a plurality of user graphical representations 844 visible there in and there over. For example, user graphical representation 844(a) is associated with an "Administrator" user, user graphical representation 844(b) is associated with user identified as "Louie", and user graphical representation 844(c) is associated with user identified as "LU". In this example, graphical representation 844(b) is associated with "Louie" is graphically high-lighted as being selected/selectable at the time of the screen shot. Graphical representation 844(b), in this example, includes a guitar graphic that is associated with the user "Louie".

Assuming that the user decides to select to switch to Louie, per step 814 in FIG. 12; then a corresponding user/session switching process would be initiated. If Louie does not require a password or other like information to log on, then the switching process would continue without requiring an applicable logon display. If Louie does require such additional inputs prior to beginning a new session and/or returning to an existing session, then GUI display 840 can be configured to provide the appropriate dialog boxes, etc. This is illustrated by dashed box 848 within graphical representation 844(b), which may be used to input a password or the like. As mentioned above, BAM logic can be provided to support the user/session switching logic.

In certain exemplary implementations, GUI display 840 is configured to rotate graphical representations 844(b) within background 842 in an animated fashion. This rotation is illustrated by dashed arrow 850, which shows that graphical representation 844(b) will be rotated clockwise to the position currently occupied by graphical representation 844(*c*). Here, graphical representation 844(*a*) would then occupy the position currently held by graphical representation 844(*b*).

In accordance with still other implementations, a hot key combination may be assigned to each user, such that the user may quickly switch to a new or existing session without requiring the logon screen or even the full GUI of FIG. 13 being shown. This personal hot key may be kept secret. Similarly, different hot key combinations can be operatively associated with different sets or groups of users, for example, to reduce the number of graphical representations that are displayed or add an additional deterrent to unauthorized access, etc.

Although some preferred embodiments of the various methods and apparatuses of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A computing device comprising:

switching logic operatively coupled to a user input device having a plurality of user activated keys, wherein one or more of said user activated keys is operatively configured as a hot key input, and configured to automatically switch console control of the computing device in a multi-user computing environment between at least two user kernel sessions corresponding to at least two users based on the activation of said hot key input, wherein said switching logic is operatively configured to cause a graphical user interface to be displayed on a display monitor associated with the computing device and said graphical user interface includes two or more selectable graphical representations associated with said at least two users, respectively, and is configured to visually rotate through the two or more selectable graphical representations associated with said at least two users;

application management logic configured to test applications within the multi-user computing environment for problems operating within the multi-user computing environment; and audio signal logic configured to adjust volumes of audio streams running in the at least two user kernel sessions effective to output a first audio stream of a first of the at least two user kernel sessions with console control and to mute a second audio stream of a second of the at least two user kernel sessions without console control in response to switching console control between the at least two kernel sessions.

* * * * *